(12) United States Patent
Han

(10) Patent No.: US 8,909,231 B2
(45) Date of Patent: Dec. 9, 2014

(54) COMMUNICATION SYSTEM, FEMTO CELL THEREOF, AND CLUSTERING AND HANDOVER METHOD OF THE SAME

(75) Inventor: Jeonghyun Han, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 38 days.

(21) Appl. No.: 13/494,343

(22) Filed: Jun. 12, 2012

(65) Prior Publication Data

US 2012/0315911 A1 Dec. 13, 2012

(30) Foreign Application Priority Data

Jun. 13, 2011 (KR) .................. 10-2011-0056713

(51) Int. Cl.
*H04W 36/00* (2009.01)
*H04W 84/04* (2009.01)

(52) U.S. Cl.
CPC ........ *H04W 36/0061* (2013.01); *H04W 84/045* (2013.01)
USPC ............................ 455/437; 455/436; 370/331

(58) Field of Classification Search
USPC .......................... 455/436–444; 370/331–334
See application file for complete search history.

(56) References Cited

U.S. PATENT DOCUMENTS

| | | | |
|---|---|---|---|
| 2009/0323633 A1* | 12/2009 | Burgess et al. ............... | 370/331 |
| 2011/0092211 A1* | 4/2011 | Osborn ......................... | 455/436 |
| 2012/0149351 A1* | 6/2012 | Kalbag ......................... | 455/418 |

* cited by examiner

*Primary Examiner* — Jinsong Hu
*Assistant Examiner* — Erica Navar
(74) *Attorney, Agent, or Firm* — Jefferson IP Law, LLP

(57) ABSTRACT

A communication system, femto cell, and clustering and handover method of the same are provided. The method includes storing identity information and customer information for a plurality of femto base stations, generating, when location information of the corresponding femto base stations are received, at least one cluster including at least one of the femto base stations according to the customer information and location information, sharing the identity information of the corresponding femto base station in the cluster. The method is capable of supporting handover between femto base stations so as to secure reliable communication service connectivity for the terminal on the move.

6 Claims, 16 Drawing Sheets

FIG. 13

| | |
|---|---|
| Cell Identifier List (Target): A1 Element Identifier = [1A] | 1 |
| Length = [06] | 2 |
| Cell Identification Discriminator = [07] | 3 |
| MSCID = [24 bit] | 4 |
| | 5 |
| | 6 |
| Cell = [12 bit], Sector = [4 bit] | 7 |
| | 8 |

FIG. 14

| | |
|---|---|
| Cell Identifier List (Target): A1 Element Identifier = [1A] | 1 |
| Length = [06] | 2 |
| Cell Identification Discriminator = [07] | 3 |
| MSCID = [0xFFFFFF] | 4 |
| | 5 |
| | 6 |
| Cell = [0xFFF], Sector = [0xF] | 7 |
| | 8 |

COMMUNICATION SYSTEM, FEMTO CELL THEREOF, AND CLUSTERING AND HANDOVER METHOD OF THE SAME

PRIORITY

This application claims the benefit under 35 U.S.C. §119(a) of a Korean patent application filed on Jun. 13, 2011 in the Korean Intellectual Property Office and assigned Serial No. 10-2011-0056713, the entire disclosure of which is hereby incorporated by reference.

BACKGROUND OF THE INVENTION

1. Field of the Invention

The present invention relates to a communication system and method. More particularly, the present invention relates to a communication system, femto cell, and clustering and handover method of the same.

2. Description of the Related Art

Typically, a mobile communication system is composed of a plurality of macro cells each of which is managed by a macro base station (e.g., evolved Node B (eNB)). The eNB provides the communication terminals (User Equipment (UE)) with communication service. In a communication system, the UE experiences change of signal environment in a specific cell, however the macro eNB serves the UE without consideration of the UE-specific signal environment. This is likely to cause communication service quality degradation and delay.

This problem can be mitigated by installing an intermediate device, such as for example, a repeater and a remote unit, between the macro eNB and UE. The macro eNB and intermediate device are installed by the service provider and result in an increase of service cost. Furthermore, the introduction of the extra device derives interoperability issue between the macro eNB and the intermediate device.

In order to solve these problems, it is proposed to deploy femto eNB(s) within the macro cell managed by the macro eNB. The femto eNB is an indoor base station installed at an area with weak macro eNB signal or shadow such as inside of a house or a building. Typically, the femto eNB is configured to provide the communication service to the UEs that have been registered with the communication system in advance.

This means that the registered UE is capable of being served by both the macro eNB and the femto eNB. In order to accomplish this, it is necessary for the communication system to support handover between macro and femto eNBs and between femto eNBs as well as between macro eNBs. Because the registered UE is capable of being served by both the macro eNB and the femto eNB, if a communication supported handovers between femto eNBs and between macro eNBs, it can be expected to improve the communication service quality in the communication system.

However, the communication system according to the related art does not support the inter-femto eNB handover of the UE. Accordingly, when the UE enters a weak signal area of the macro eNB or a shadow area, it is necessary to perform the handover from the femto eNB to the macro eNB and then the handover from the macro eNB to another femto eNB. This causes the degradation of seamless connectivity of the communication service to the UE.

There is therefore a need of a method for securing robust communication service connectivity of a UE in a communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method for securing robust communication service connectivity of a UE in a communication system.

In accordance with an aspect of the present invention, a method for clustering femto base stations in a communication system is provided. The method includes storing identity information and customer information for a plurality of femto base stations, generating, when location information of the corresponding femto base stations are received, at least one cluster including at least one of the femto base stations according to the customer information and location information, and sharing the identity information of the corresponding femto base station in the cluster.

In accordance with another aspect of the present invention, a method for a femto base station to support handover in a communication system is provided. The method includes determining, when a terminal connected to the femto base station requests for handover, whether the handover is directed to another femto base station in the same cluster, and performing, when the handover is directed to the another femto base station in the same cluster, the handover to the another femto base station.

In accordance with another aspect of the present invention, a communication system is provided. The system includes a plurality of femto base stations that transmit respective location information at power-on, and a femto manager which stores identity information for the femto base stations and customer information, generates, when receiving location information of the respective femto base stations, at least one cluster including a least one of the femto base station according to the corresponding customer information and location information, and shares the identity information of the corresponding femto base stations in the cluster.

In accordance with another aspect of the present invention, a handover execution apparatus of a femto base station in a communication system is provided. The apparatus includes a memory which stores identity information of another femto base station in a cluster to which the current femto base station belongs, a determination unit which determines, when a handover request is received from a terminal connected to the femto base station, whether the handover is directed to the another femto base station, and a controller which controls, when the handover is directed to the another femto base station, the handover to the another femto base station.

In accordance with another aspect of the present invention, a method for a femto base station to support handover in a communication system is provided. The method includes determining, when a terminal connected to the femto base station requests for handover, whether the handover is directed to another femto base station, and performing, when the handover is directed to the another femto base station, the handover to the another femto base station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

FIG. 13 is a diagram illustrating a format of a handover request message for use in a handover according to an exemplary embodiment of the present invention;

FIG. 14 is a diagram illustrating a format of a handover request message for use in a handover according to another exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, description of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
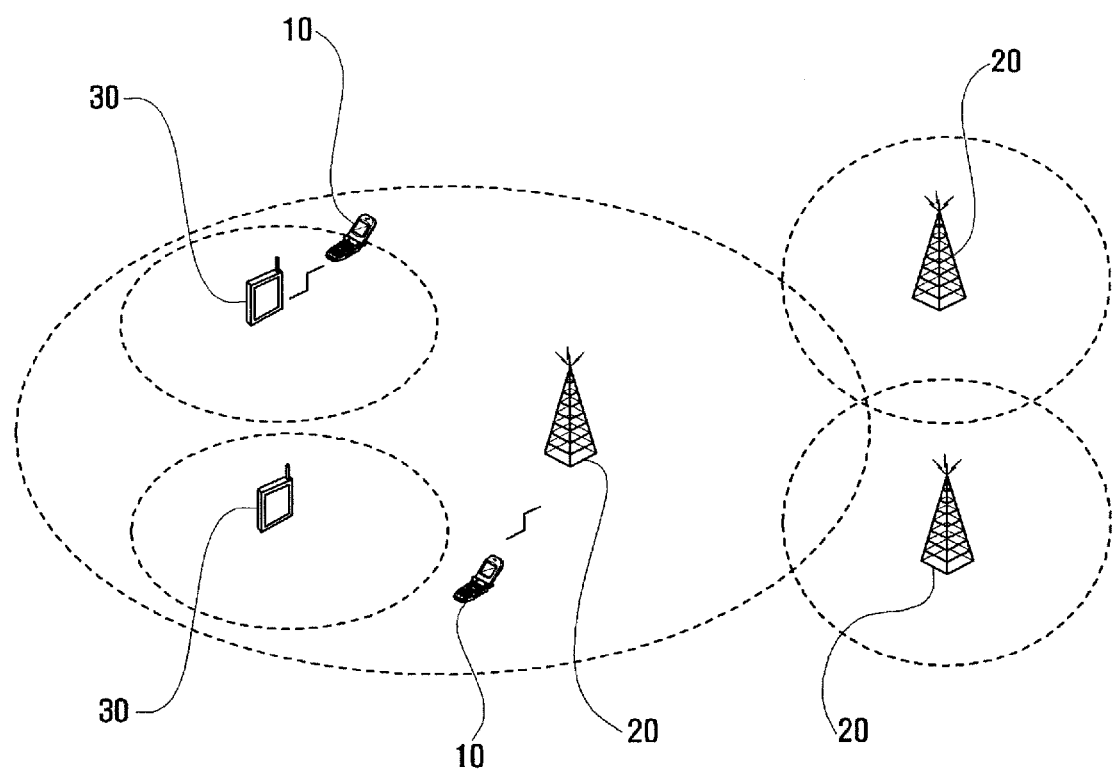
FIG. 1 is a diagram illustrating an exemplary environment of a communication system according to an exemplary embodiment of the present invention.

FIG. 1 is a diagram illustrating an exemplary environment of a communication system according to an exemplary embodiment of the present invention.

Referring to FIG. 1, the communication system includes a plurality of macro cells. In the communication system, at least one of the macro cells includes at least one femto cell. The communication system includes UEs 10, macro eNBs 20, and femto eNBs 30.

The UE 10 may roam across a macro cell boundary. The macro eNB 20 manages its macro cell and provides the UE with the communication service within the corresponding macro cell. The femto eNB 30 manages its femto cell deployed in the macro cell and provides the UE with the communication service within the femto cell. When entering a specific macro cell, the UE 10 connects to a the corresponding macro eNB 20. Also, when the UE 10 moves to a femto cell within the macro cell, the UE 10 connects to the corresponding femto eNB 30 within the femto cell. As an example, the UE 10 might be pre-registered for receiving communication service from the femto eNB 30. The UE 10 may be served by the macro eNB 20 or the femto eNB 30.

The communication system according to an exemplary embodiment of the present invention supports handover of the UE 10 between macro eNBs 20, between macro eNB 20 and femto eNB 30, and between femto eNBs 30.

Although the description is directed to a handover of the UE 10 between femto eNBs 30, the present invention is not limited thereto. That is, the communication system according to exemplary embodiments of the present invention supports handover between the macro eNBs 20 and between the macro eNB 20 and femto eNB 30, as well as between femto eNBs 30.

Figure 2:
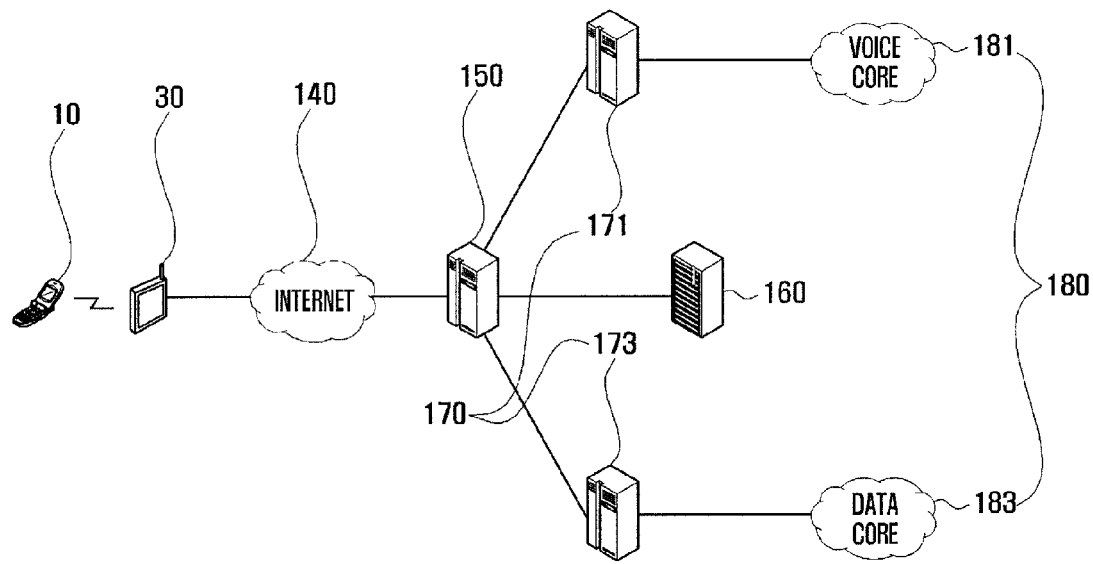
FIG. 2 is a diagram illustrating a configuration of a communication system for supporting an operation of femto eNBs according to an exemplary embodiment of the present invention.

FIG. 2 is a diagram illustrating a configuration of a communication system for supporting an operation of femto eNBs according to an exemplary embodiment of the present invention.

Referring to FIG. 2, the communication system further includes a UE 10, a femto eNB 30, a security gateway 150, a femto manager 160, and a femto switch 170. The UE 10 may perform radio access with the femto eNB 30, and the femto eNB 30 connects to the security gateway through Internet 140 managed by an Internet Service Provider (ISP).

The security gateway 150 connects to the femto manager 160 and the femto switch 170 separately. The security gateway 150 relays the communication between the femto eNB 30 and the femto manager 160 and between the femto eNB 30 and the femto switch 170. That is, the security gateway 150 provides the security service between the femto eNB 30 and the femto manager 160 and between the femto eNB 30 and the femto switch 170. In order to accomplish this, the security gateway 150 may be provided with a firewall function and an Internet Protocol (IP) security function.

The femto eNB 160 manages the femto eNBs 30 remotely. That is, the femto manager 160 stores and provides MAC address, frequency allocation, Pseudo Noise offset, and authentication information, for auto self-installation and configuration of the femto eNB 30. The femto manager 160 also stores the management information on the femto eNBs 30 according to an exemplary embodiment of the present invention. As an example, the management information includes a femto identifier, customer information, and location information. For example, the femto identifier corresponds to information for identifying the femto eNBs 30, the customer information corresponds to customer identity information, and the location information corresponds to information indicating the location of the femto eNB. The femto manager 160 clusters the femto eNBs 30 based on the customer information and the location information so as to generate at least one cluster according to an exemplary embodiment of the present invention. The femto manager 160 controls the femto eNBs 30 such that the femto eNBs 30 share the identity information within the cluster according to an exemplary embodiment of the present invention.

The femto switch 170 connects to the core network 180. The femto switch 170 supports packet communication between the femto eNB 30 and the core network 180. The femto switch 170 also supports handover of the UE 10. According to an exemplary embodiment of the present invention, the femto switch 170 supports the handover between macro eNBs 20, between macro eNB 20 and femto eNB 30, and between femto eNBs 30. The femto switch 170 includes a voice switch 171 such as, for example, a Wireless Soft Switch (WSS), Wireless Gate-Way (WGW), and the like, and a data switch 173 such as, for example, a Packet Control Function (PCF) or the like. The core network 180 may be divided into a voice core network 181 and a data core network 183. For example, the voice switch 171 is responsible for voice packet switching between the femto eNB 30 and the voice core network 181, and the data switch 173 is responsible for data packet switching between the femto eNB 30 and the data core network 183.

Figure 3:
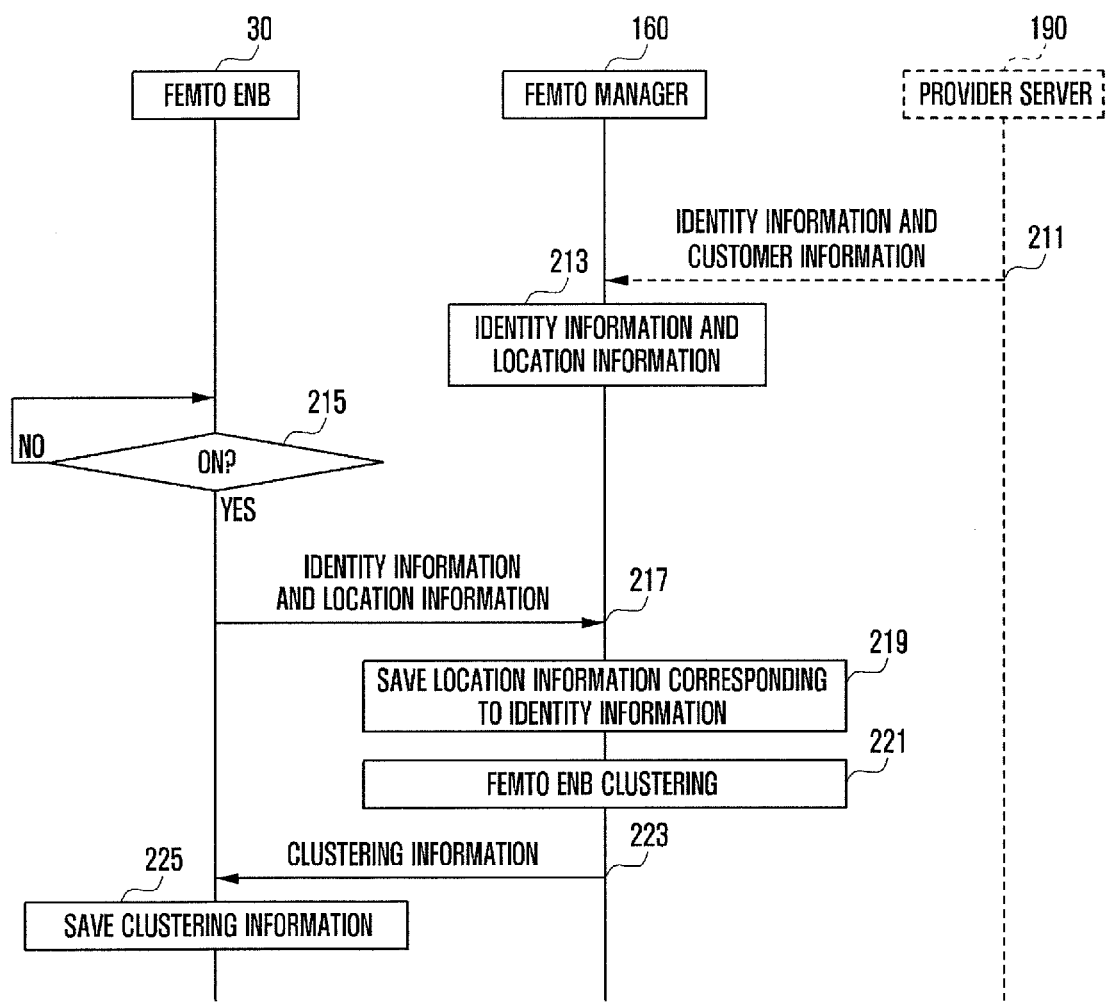
FIG. 3 is a signaling diagram illustrating a clustering procedure of a communication system according to an exemplary embodiment of the present invention.
Figure 4:
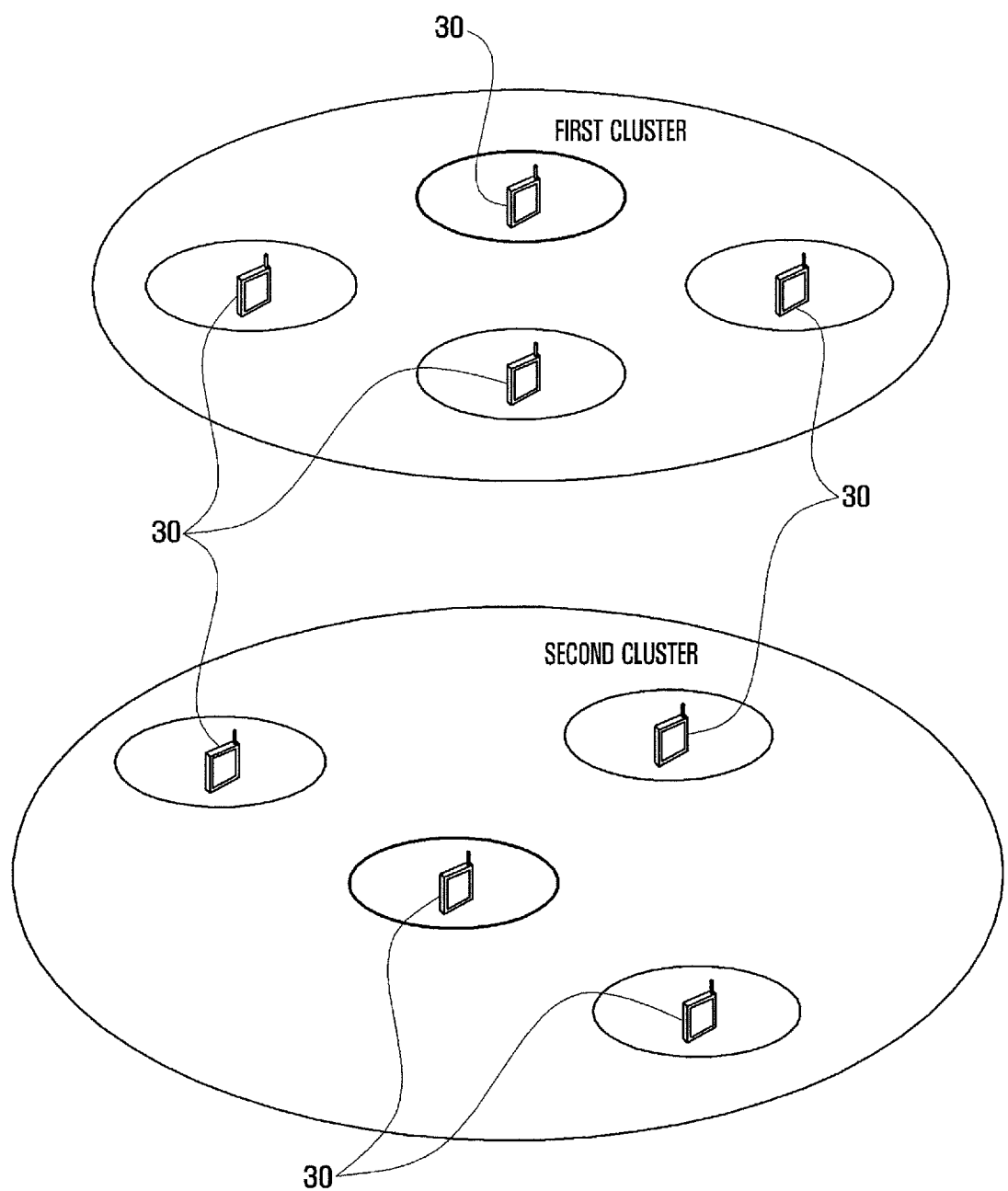
FIG. 4 is a diagram illustrating a configuration of clusters generated according to a clustering procedure according to an exemplary embodiment of the present invention such as, for example, the procedure of FIG. 3.
Figure 5:
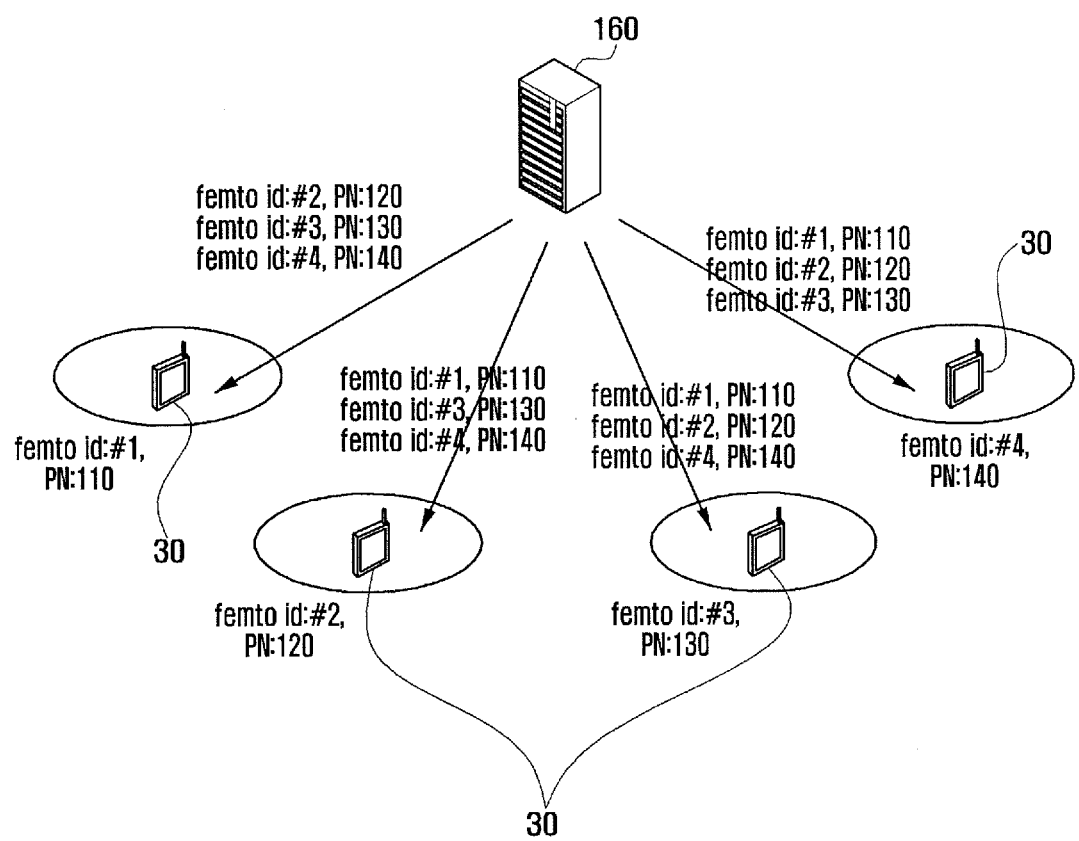
FIG. 5 is a diagram illustrating a principle of sharing information on clusters generated according to a clustering procedure according to an exemplary embodiment of the present invention such as, for example, the procedure of FIG. 3.

FIG. 3 is a signaling diagram illustrating a clustering procedure of a communication system according to an exemplary embodiment of the present invention. FIG. 4 is a diagram illustrating a configuration of clusters generated according to a clustering procedure according to an exemplary embodiment of the present invention such as, for example, the procedure of FIG. 3. FIG. 5 is a diagram illustrating a principle of sharing information on clusters generated according to a clustering procedure according to an exemplary embodiment of the present invention such as, for example, the procedure of FIG. 3.

Referring to FIG. 3, the clustering procedure of the communication system according to an exemplary embodiment of the present invention begins such that the femto manager 160 receives the femto eNB identity information and the customer information from the provider server 190 at step 211. That is, the provider server 190 registers the identity information of the femto eNB 30 and the customer information in response to the user request through the femto eNB 30. The owner of the femto eNB 30 can register the identity information of the femto eNB 30 and the user information with the femto eNB 30. The provider server 190 sends the identity information of the femto eNB 30 and the customer information to the femto manager 160. Afterward, the femto manager 160 saves the identity information on the femto eNB 30 and the customer information at step 213. The femto eNB 160 may sort out a plurality of femto eNBs 30 by user to facilitate management.

If the femto eNB 30 powers on, the femto eNB 30 detects the power-on at step 215. The femto eNB 30 sends its identity information and its location to the femto manager 160 at step 217. As an example, the location information includes latitude information and longitude information. If the femto manager 160 receives the identity information and the location information of the femto eNB 30, then at step 219, the femto manager 160 saves the location information along with the customer information stored previously in association with the identity information of the femto eNB 30. The femto manager 160 can manage the femto eNBs 30 with the management information thereof.

Next, the femto manager 160 clusters the femto eNBs 30 at step 221. At this time, the femto manager 160 clusters the femto eNBs 30 based on the customer information and the location information per femto eNB 30. The femto manager 160 may generate the cluster with at least one femto eNB 30 to have the same customer information. The femto manage 160 also may generate at least two clusters each having the femto eNBs 30 located within a range of a predetermined distance. The femto manager 160 also may generate the clusters such that each cluster has a predetermined number of femto eNBs 30. In such a way, the femto manager 160 may generate a plurality of clusters (e.g. first cluster and second cluster as shown in FIG. 4). The femto manager 160 also generates clustering information on each cluster. As an example, the clustering information includes the identifiers of the femto eNBs 30 belonging to each respective cluster and a pseudo noise code per femto eNB 30. The femto eNBs 30 of each cluster are configured to use different pseudo noise codes.

Next, the femto manager 160 sends the clustering information to the femto eNBs 30 belonging to the respective clusters at step 223 (e.g., as illustrated in FIG. 5). That is, the femto manager 160 controls such that the femto eNBs 30 belonged to the same cluster share the identity information. If the femto eNB 30 receives the clustering information from the femto manager 160, the femto eNB 30 saves the clustering information at step 225. That is, the femto eNB 30 checks the identity information and the pseudo noise codes of the femto eNBs 30 belonging to the same cluster based on the clustering information and saves the identity information and pseudo noise codes.

Figure 6:
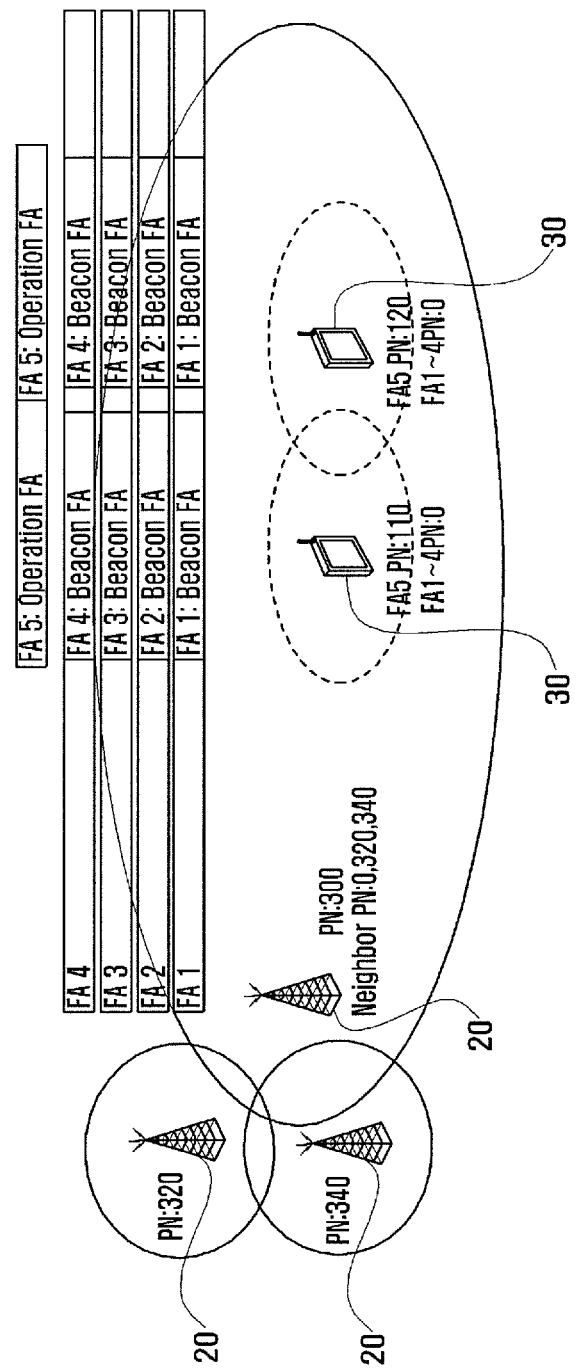
FIG. 6 is a diagram illustrating a frequency allocation in a communication system according to an exemplary embodiment of the present invention.

FIG. 6 is a diagram illustrating a frequency allocation in a communication system according to an exemplary embodiment of the present invention.

Referring to FIG. 6, the macro eNBs 20 and femto eNBs 30 use the same Frequency Area (FA). For example, the macro eNB 20 uses four FAs, while the femto eNB3 30 use the same FAs as their Beacon FAs. At this time, the femto eNBs 30 use the same pseudo noise code (e.g. 0), on the beacon FAs. Through this, it is possible to perform the handover from the macro eNB 20 to the femto eNB 30 (i.e. in-bound handover). When moving to the femto cell within the macro cell, the UE 10 may detects the pseudo noise code 0 in one of the beacon FAs. In this manner, it is possible to perform handover of the UE 10 from the macro eNB 20 to the femto eNB 30.

Meanwhile, the femto eNBs 30 uses the FAs that are not used by the macro eNB 20 as their operation FAs according to an exemplary embodiment of the present invention. Here, the femto eNBs 30 may check the operation FA by referencing the message transmitted in the beacon FA. At this time, the femto eNBs 30 use different pseudo noise codes that are not used by the macro eNB 20 in correspondence to the operation FA. For example, one of the femto eNBs 30 uses a pseudo noise code of 110 corresponding to the operation FA while another of the femto eNBs 30 uses a pseudo noise code of 120. In this manner, it is possible to perform handover between femto eNBs 30 on the operation FAs. When moving between femto cells, the UE 10 may detect the pseudo noise code of 120 on the operation RA. Accordingly, it is possible to perform the handover of the UE 10 between the femto eNBs 30.

Figure 7:
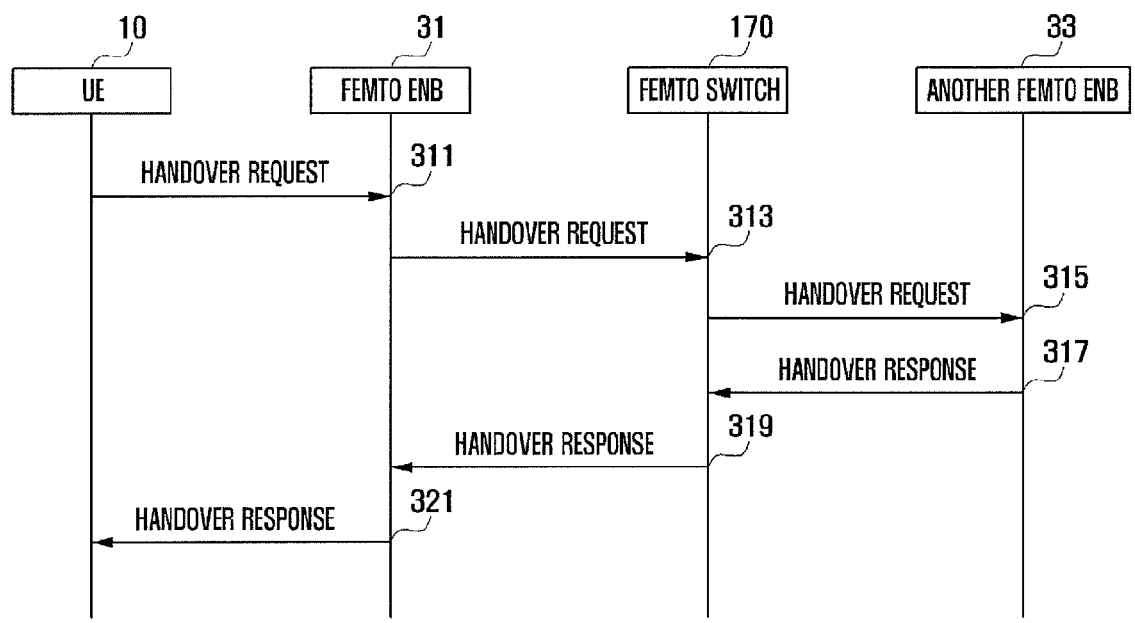
FIG. 7 is a signaling diagram illustrating a handover procedure between femto cells in a communication system according to an exemplary embodiment of the present invention.
Figure 8:
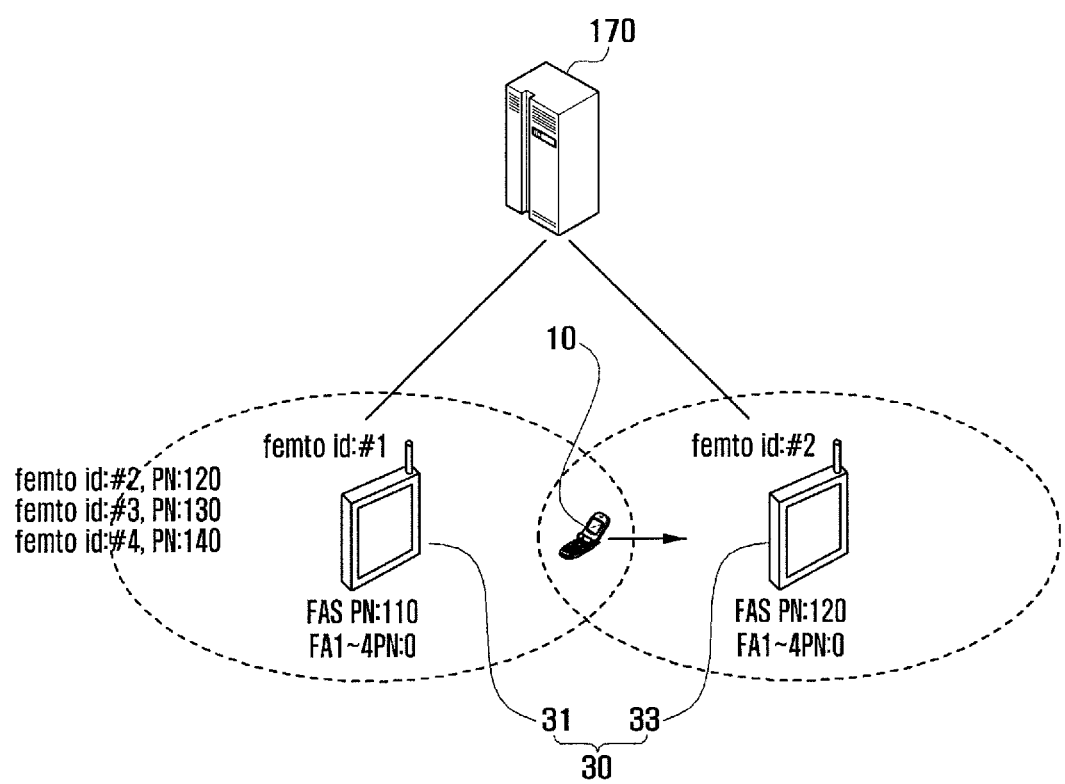
FIG. 8 is a diagram illustrating a principle of an inter-femto eNB handover according to an exemplary embodiment of the present invention such as, for example, the handover procedure of FIG. 7.

FIG. 7 is a signaling diagram illustrating a handover procedure between femto cells in a communication system according to an exemplary embodiment of the present invention. FIG. 8 is a diagram illustrating a principle of an inter-femto eNB handover according to an exemplary embodiment of the present invention such as, for example, the handover procedure of FIG. 7.

Referring to FIGS. 7 and 8, the handover procedure in the communication system according to an exemplary embodiment of the present invention begins such that the UE 10 requests a handover from the currently connected femto eNB 31 at step 311. At this time, the UE 10 sends a pseudo noise code corresponding to another femto eNB 33 to the femto eNB 31 to request for the handover to the other femto eNB 33. That is, when moving between the femto cells, the UE 10 may detect the pseudo noise code of 120 on the operation FA. The UE may send the pseudo noise code of 120 to the femto eNB 31.

If the UE 10 requests handover, the femto eNB 31 requests the femto switch 170 for handover at step 313. That is, the femto eNB 31 checks another femto eNB 33 according to the pseudo noise coded received from the UE 10 and requests the femto switch 170 for the handover to the femto eNB 33. At this time the femto eNB 31 may check whether the femto eNB 33 corresponding to the pseudo noise code received from the UE 10 exists in the same cluster as the femto eNB 31, based on the clustering information. If the femto eNB 33 exists, the femto eNB 31 acquires the identity information on the femto eNB 33 from the clustering information and sends the identity information to the femto switch 170. That is, the femto eNB 31 may acquires the identity information of the femto eNB 33 (i.e., femto id#2), in correspondence with the pseudo noise code of 120. The femto eNB 31 may send the identity information (i.e., femto id#2) of the femto eNB 33 to the femto switch 170.

If the handover request is received from the femto eNB 31, the femto switch 170 requests the other femto eNB 33 for the handover at step 315. That is, the femto switch 170 checks the femto eNB 33 according to the identity information received from the femto eNB 31 and requests the femto eNB 33 for handover. Upon receipt of the handover request from the femto switch 170, the femto eNB 33 sends a handover response to the femto switch 170 at step 317. At this time, the femto eNB 33 determines whether to accept or reject the handover request, and sends the determination result to the femto switch 170.

If the handover response is received form the femto eNB 33, the femto switch 170 forwards the handover response to the femto eNB 31 at step 319. That is, the femto switch 170 sends the femto eNB 31 the handover response indicating whether the handover is accepted or rejected. Upon receipt of the handover response, the femto eNB 31 forwards the handover response to the UE 10 at step 321. That is, the femto eNB 31 sends the UE 10 the handover response indicating whether the handover is accepted or rejected. If the femto eNB 33 has accepted the handover request, the femto eNB 31 instructs the UE 10 to perform handover. The handover of the UE 10 from the femto eNB 31 to the femto eNB 33 is performed in this way.

Figure 9:
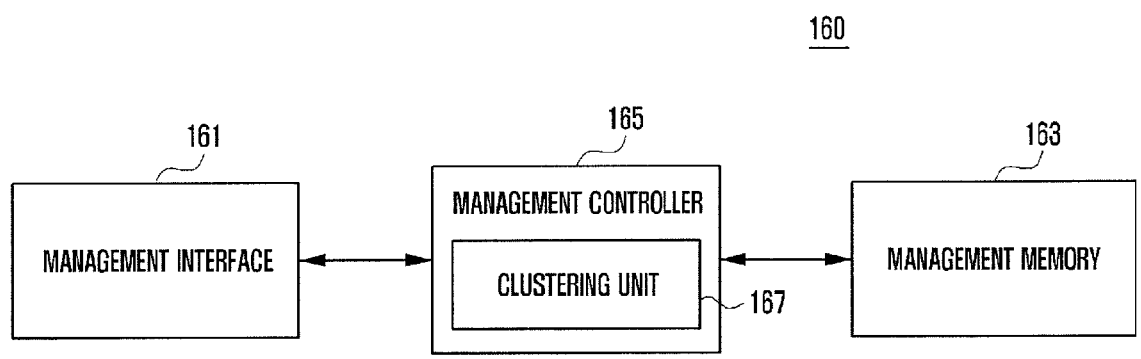
FIG. 9 is a block diagram illustrating a configuration of a femto manager of a communication system according to an exemplary embodiment of the present invention.

FIG. 9 is a block diagram illustrating a configuration of a femto manager of a communication system according to an exemplary embodiment of the present invention.

Referring to FIG. 9, the femto manager 160 includes a management interface 161, a management memory 163, and a management controller 165.

The management interface 161 is responsible for interfacing the femto manager 160 with another node. At this time, the management interface 161 is responsible for interfacing the management gateway 150 for communication with the femto eNB 30.

According to exemplary embodiments of the present invention, the management memory 163 stores a MAC address, a frequency allocation, a pseudo noise offset, and authentication information for auto self-installation and configuration of the femto eNB 30. The management memory 163 also stores the programs for clustering the femto eNBs 30 according to an exemplary embodiment of the present invention. The management memory 163 stores management information on the femto eNBs 30 according to an exemplary embodiment of the present invention. The management information includes the identity information, customer information, and the location information per femto cell. Here, the identity information corresponds to the information discriminating among the femto eNBs 30, the customer information corresponds to the information indicating the user of the femto eNB 30, and the location information corresponds to the information indicating the installation location of the femto eNB 30 (e.g., latitude and longitude information).

The management controller 165 is responsible for controlling overall operations of the femto manager 160. For example, the management controller 165 clusters the femto eNBs 30 according to an exemplary embodiment of the present invention. In order to accomplish this, the management controller 165 is provided with a clustering unit 167. The clustering unit 167 clusters the femto eNBs 30 according to the customer information and location information, and generates at least one cluster. The management controller 165 controls such that the femto eNBs 30 share the identity information in the cluster.

Figure 10:
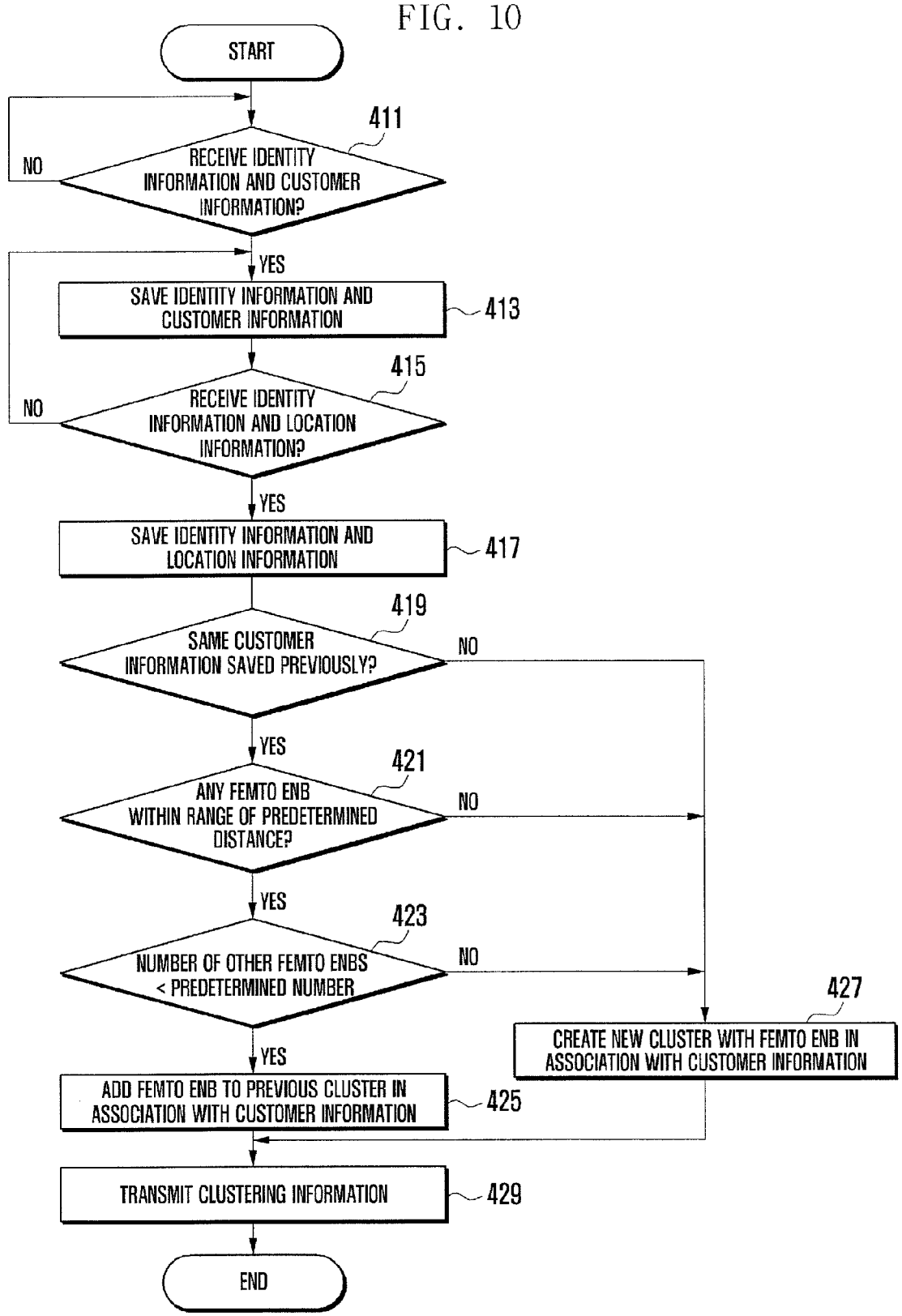
FIG. 10 is a flowchart illustrating an eNB clustering procedure of a femto manager in a communication system according to an exemplary embodiment of the present invention.

FIG. 10 is a flowchart illustrating an eNB clustering procedure of a femto manager in a communication system according to an exemplary embodiment of the present invention.

Referring to FIG. 10, the clustering procedure of the femto manager 160 according to an exemplary embodiment of the present invention begins with the management controller 165 receiving the identity information of the femto eNB and the customer information from the provider server 190 at step 411. The provider server 190 registers the identity information of the femto eNB 30 and the customer information according to the user request from the femto eNB 30. When the user purchases a new femto eNB 30, the provider server 190 may register the corresponding identity information of the femto eNB 30 and the customer information. The provider server sends the identity information of the femto eNB 30 and customer information to the femto manager 160. Next, the management controller 165 saves the identity information of the femto eNB 30 and the customer information at step 413.

If the identity information of the femto eNB 30 and the location information are received from the femto eNB 30, the management controller 165 detects reception of the identity information and the location information at step 415. The management controller 165 saves the location information along with the customer information in match with the identity information of the femto eNB 30 at step 417. For example, the location information includes the latitude information and the longitude information of the installation location of the femto eNB 30. That is, the management controller 165 configures and saves the management information of the femto eNB 30.

Next, the management controller 165 determines whether there is the same customer information stored previously as the femto eNB 30 at step 419. That is, the management controller 165 determines whether there exists a cluster created previously in association with the same customer information as the femto eNB 30.

If it is determined at step 419 that there is the same customer information stored previously, the management controller 165 determines whether another femto eNB exists within a predetermined range around the femto eNB 30 at step 421. That is, when there is the cluster created already in correspondence with the same customer information of the femto eNB 30, the management controller 165 determines whether the distance between the femto eNB 30 and another femto eNB included in the previously created cluster is appropriate for supporting handover of the UE 10.

If there is at least one other femto eNB 30 at step 421, the management controller 165 determines whether the number of other femto eNBs found within the range around the femto eNB 30 is less than a predetermined value at step 423. That is, the management controller 165 determines that the distance between the two femto eNBs are appropriate for supporting handover of the UE 10. The management controller 165 determines whether the number of other femto eNBs belonging to the previously created cluster is less than a predetermined value.

If it is determined at step 423 that the number of other femto eNBs is less than a predetermined value, the management controller 165 adds the femto eNB 30 to the previously created cluster in association with the same customer information as the femto eNB 30 at step 425. That is, so long as the number of other femto eNBs is not greater than a predetermined value, the management controller 165 adds the femto eNB 30 to the previously created cluster.

Otherwise, if it is determined at step 419 that there is no same customer information as the femto eNB 30, the management controller 165 creates a new cluster corresponding to the customer information of the femto eNB 30 at step 427. That is, when there is no cluster created previously in correspondence to the same customer information as the femto eNB 30, the management controller 165 configures a new cluster with the femto eNB 30.

If it is determined at step 421 that there is no other femto eNB within a predetermined range around the femto eNB 30, the management controller 165 creates a new cluster corresponding to the customer information of the femto eNB 30. That is, although there is any cluster created previously in association with the customer information of the femto eNB 30, the management controller 165 generates a new cluster in separation from the previously created cluster. The management controller 165 judges that the distance between the current femto eNB and the other femto eNB is not appropriate for supporting handover of the UE 10 so as to configure a new cluster with the femto eNB 30.

If it is determined at step 423 that the number of other femto eNBs within a predetermined range around the current femto eNB 30 is equal to or greater than the predetermined value, the management controller 165 creates a new cluster corresponding to the user information of the femto eNB 30 at step 427. That is, the management controller 165 configures a new cluster with the femto eNB 30 such that the number of other femto eNBs of the previously generated cluster is maintained to be equal to or less than the predetermined value.

Finally, the management controller 165 generates and transmits the clustering information corresponding to the cluster at step 429. If the femto eNB 30 is added to the previously generated cluster, the management controller 165 generates the clustering information associated with current femto eNB and the other femto eNBs corresponding to the previously created cluster. Here, the management controller 165 may generate the clustering information with the identity information of the current femto eNB 30 and other femto eNBs 30 and pseudo noise codes for use in the operation FAs of the current femto eNB and the other femto eNBs. The management controller 165 sends the clustering information to the current femto eNB and the other femto eNBs. If the new cluster is created with the femto eNB 30, the management controller 165 may generate the clustering information with the identity information of the current eNB and the pseudo noise code for use in the operation FA of the current femto eNB 30. The management controller 165 sends the clustering information to the femto eNB 30.

Figure 11:
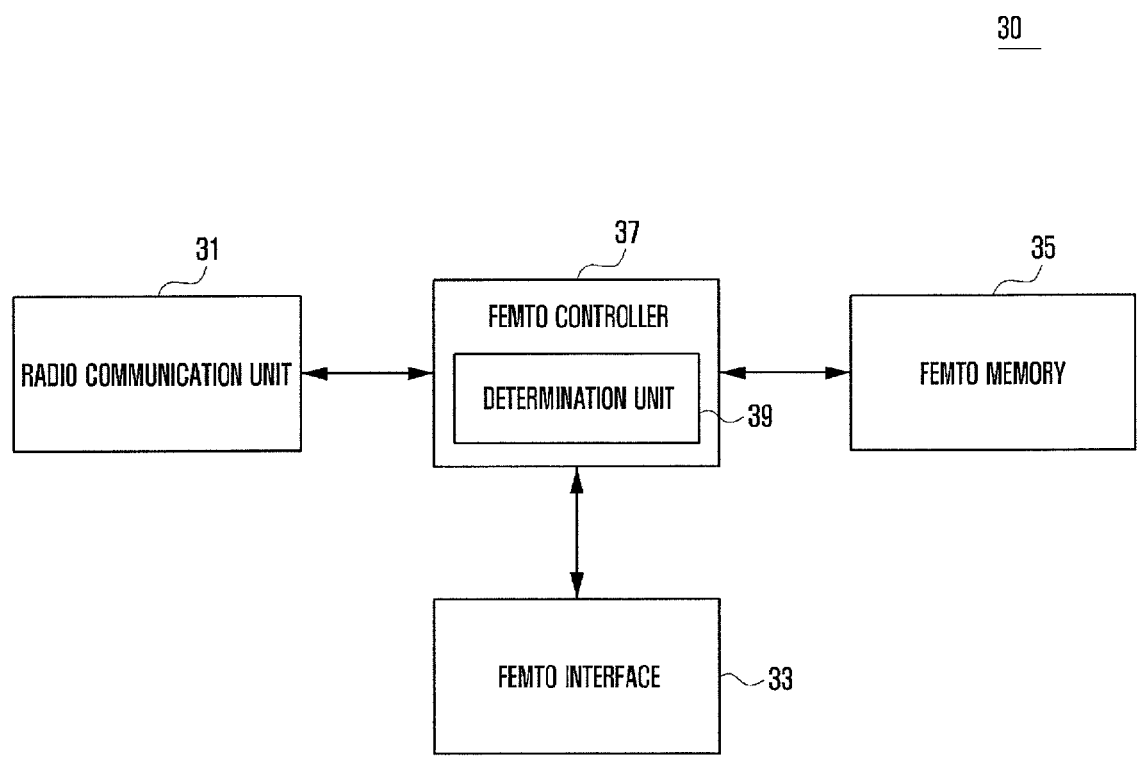
FIG. 11 is a block diagram illustrating a configuration of a femto eNB according to an exemplary embodiment of the present invention.

FIG. 11 is a block diagram illustrating a configuration of a femto eNB according to an exemplary embodiment of the present invention.

Referring to FIG. 11, the femto eNB 30 according to an exemplary embodiment of the present invention includes a radio communication unit 31, a femto interface unit 33, a femto memory 35, and a femto controller 37.

According to exemplary embodiments of the present invention, the radio communication unit 31 is responsible for the radio communication function of the femto eNB 10. The radio communication unit 31 transmits signals to the UE 10 and receives signals transmitted to the UE 10. The radio communication unit 31 may receive a request for handover to another femto eNB from the UE according to an exemplary embodiment of the present invention.

According to exemplary embodiments of the present invention, the femto interface unit 33 is responsible for interfacing the femto eNB with another node. At this time, the femto interface unit 330 interfaces with security gateway 150 for communication with the femto manager 160 or the femto switch 170. For example, the femto interface unit 33 may receive the clustering information from the femto manager 160 according to an exemplary embodiment of the present invention.

According to exemplary embodiments of the present invention, the femto memory 35 stores the programs for executing hand over to another femto eNB 30 according to an exemplary embodiment of the present invention. The femto memory 35 stores the identity information and the location information on the femto eNB 30 according to an exemplary embodiment of the present invention. The femto memory 35 also stores the clustering information according to an exemplary embodiment of the present invention. As an example, the clustering information includes the identity information and pseudo noise code of another femto eNB belonging to the same cluster as the current femto eNB 30.

According to exemplary embodiments of the present invention, the femto controller 37 is responsible for controlling overall operations of the femto eNB 30. The femto controller 37 controls to store the clustering information received from the femto manager 160. The femto controller 37 performs handover to another eNB 30 in response to a request from the UE 10 according to an exemplary embodiment of the present invention. In order to perform such a handover, the femto controller 37 includes a determination unit 39. The determination unit 39 checks other femto eNBs 30 based on the pseudo noise code received from the UE. At this time, the determination unit 39 determines, based on the clustering information, whether there is any other femto eNB corresponding to the pseudo noise code received from the UE 10 within the same cluster as the current femto eNB 30. If another femto eNB exists, the femto controller 37 requests the femto switch 170 for handover using the identity information of the other femto eNB according to an exemplary embodiment of the present invention. That is, the femto controller 37 acquires the identity information on the other femto eNB from the clustering information and sends the acquired identity information to the femto switch 170.

Figure 12:
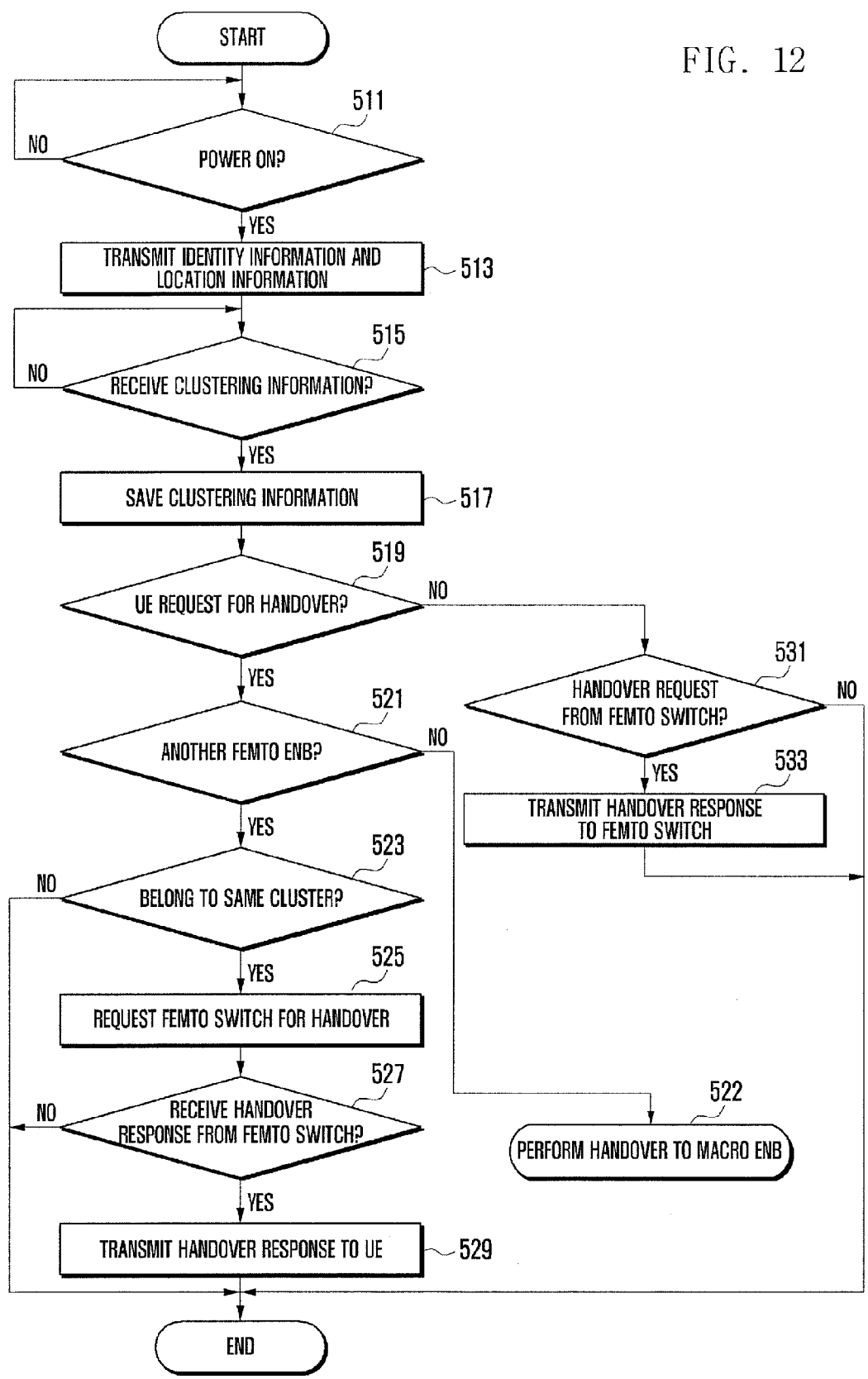
FIG. 12 is a flowchart illustrating a handover procedure of a femto eNB according to an exemplary embodiment of the present invention.

FIG. 12 is a flowchart illustrating a handover procedure of a femto eNB according to an exemplary embodiment of the present invention. FIG. 13 is a diagram illustrating a format of a handover request message for use in a handover according to an exemplary embodiment of the present invention. FIG. 14 is a diagram illustrating a format of a handover request message for use in a handover according to another exemplary embodiment of the present invention.

Referring to FIG. 12, the handover procedure of the femto eNB 30 according to an exemplary embodiment of the present invention starts with the power-on of the femto eNB at step 511. If the power-on of the femto eNB 30 is detected at step 511, the femto controller 37 sends the femto manager 160 the identity information and the location information of the femto eNB 30 at step 513. For example, the location information includes the latitude and longitude information of the installation location of the femto eNB 30. The femto controller 37 monitors receipt of the clustering information at step 515. If the clustering information is received, the femto controller 37 saves the clustering information at step 517. That is, the femto eNB 30 checks the identity information and pseudo noise codes of other femto eNBs of the same cluster to which the current femto eNB 30 belongs from the clustering information and stores the identity information and pseudo noise codes. If clustering information is not received at step 515, then the femto controller 37 continues monitoring for receipt of the clustering information.

Next, the femto controller 37 monitors receipt of handover request from the currently connected UE 10 at step 519. If the handover request is received, the femto controller 37 determines whether the target eNB of the handover is another femto eNB at step 521. For example, this can be determined based on the pseudo noise code received from the UE 10.

If it is determined that the target eNB of the handover is not another femto eNB at step 521, the femto controller 37 controls the handover to a macro eNB 20 at step 522. That is, if it is determined that the UE 10 has requested for the handover to the macro eNB 20, the femto controller 37 requests the femto switch 170 for the handover to the macro eNB 20. At this time, the femto controller 37 may generate a handover request message formatted as shown in FIG. 13 to the femto switch 170. The femto controller 37 configures the handover request message with 24-bit Mobile Switching Center Identifier (MSCID), 12-bit cell information, and 4-bit sector information. The handover request message may also include cell identifier list information, length information, and cell identification discriminator information. If a handover response message is received from the femto switch 170 afterward, the femto controller 27 forwards the handover response message to the UE 10.

If it is determined that the target eNB of the handover is another femto eNB at step 521, the femto controller 37 determines whether the target femto eNB is included in the same cluster as the current femto eNB 30 at step 523. At this time, the femto controller 37 may determines, based on the clustering information, whether another femto eNB corresponding to the pseudo noise code received from the UE 10 exists in the cluster to which the current femto eNB 30 belongs. If it is determined that the target femto eNB is included in the same cluster as the current eNB 30, the femto controller 37 requests the femto switch 170 for the handover to the target femto eNB at step 525. That is, if the handover target eNB exists in the same cluster, the femto controller 37 acquires the identity information on the target femto eNB from the clustering information and sends this information to the femto switch 170. At this time, the femto controller 27 may send the femto switch 170 the handover request message formatted as shown in FIG. 14. Here, the femto controller 27 configures the handover request message has a size equal to that of the macro eNB 20 but a structure different from that of the macro eNB 20. The handover request message includes 24-bit MSCID, 12-bit cell information, and 4-bit sector information. The femto controller 37 configures such that the two bits at the beginning of each of MSCID, cell information, and sector information are fixed as 0x while leaving the rest bits being variable. The handover request message may also include cell identifier list information, length information, and cell identification discriminator information.

The femto controller 37 monitors receipt of a handover response from the femto switch 170 at step 527. If the handover response is received at step 527, the femto control 37 forwards the handover response to the UE 10 at step 529. That is, if the handover response message is received from the femto switch 170 in response to the handover request message, the femto controller 37 responds to the handover request of the UE 10. At this time, the femto controller 37 generates the handover response by reflecting whether to accept or reject the handover request to the target femto eNB. If the target femto eNB has accepted the handover request, the femto controller 37 commands the UE 10 to execute the handover. In this procedure, the UE 10 can perform handover from one femto eNB to another femto eNB. If a handover response is not received at step 527, then the process ends.

If no handover request is received at step 519, the femto controller 27 determines whether there is a handover request from the femto switch 170 at step 531. If the handover request is received from the femto switch 170, the femto controller 37 responds to the handover request sent by the femto switch 170 at step 533. At this time, if the handover is requested by the femto switch 170 to another femto eNB, the femto controller 37 determines whether to accept the handover of the UE 10 to the target femto eNB. Finally, the femto controller 37 responds to the handover request sent by the femto switch 170 by reflecting the determination result. If no handover request is received from the femto switch 170, then the process ends.

Figure 15:
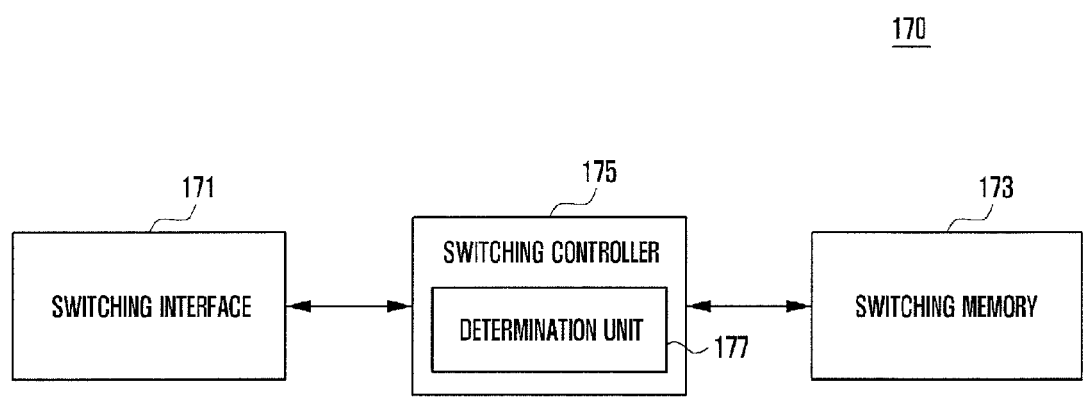
FIG. 15 is a block diagram illustrating a configuration of a femto switch according to an exemplary embodiment of the present invention.

FIG. 15 is a block diagram illustrating a configuration of a femto switch according to an exemplary embodiment of the present invention.

Referring to FIG. 15, the femto switch 170 according to an exemplary embodiment of the present invention includes a switching interface 171, a switching memory 173, and a switching controller 175.

According to exemplary embodiments of the present invention, the switching interface 171 is responsible for interfacing the femto switch 170 with another node. The switching interface 171 is responsible for interfacing with the security gateway 150 for communication with the femto eNB 30.

According to exemplary embodiments of the present invention, the switching memory 173 stores the program for supporting handover between femto eNBs 30 according to an exemplary embodiment of the present invention.

According to exemplary embodiments of the present invention, the switching controller 175 is responsible for controlling overall operations of the femto switch 170. The switching controller 175 supports handover between femto eNBs 30 and between femto eNB 30 and macro eNB 20. In order to accomplish this, the switching controller 175 is provided with a determination unit 177. The determination unit 177 determines whether to accept the handover between the femto eNBs 30 or between the femto eNB 30 and macro eNB 20.

Figure 16:
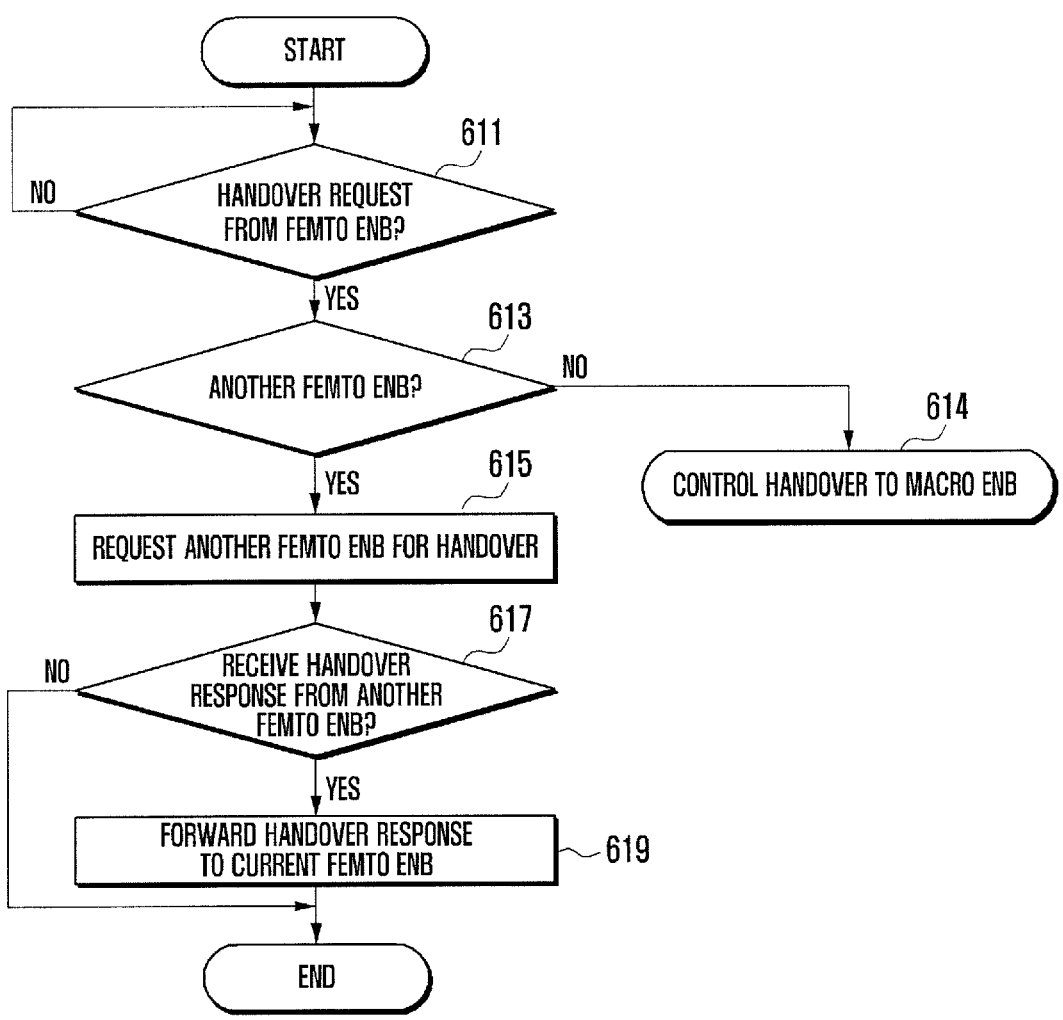
FIG. 16 is a flowchart illustrating a femto switch procedure for handover between femto eNBs according to an exemplary embodiment of the present invention.

FIG. 16 is a flowchart illustrating a femto switch procedure for handover between femto eNBs according to an exemplary embodiment of the present invention.

Referring to FIG. 16, the handover procedure of the femto switch 170 according to an exemplary embodiment of the present invention, the switching controller 175 starts with receipt of the handover request from the femto eNB 30 at step 611. Upon receipt of the handover request, the switching controller 175 determines whether the target eNB indicated by handover request is another femto eNB at step 613. As an example, at this time, the switching controller 175 may check the MSCID, cell information, and sector information carried in the handover request message to determine whether the target eNB is a femto eNB.

If it is determined that the target eNB is a macro eNB at step 613, the switching controller 175 controls the handover to the macro eNB 20 at step 614. If the handover request message is received in the format of FIG. 13, the switching controller 175 can control the handover from the femto eNB 30 to the macro eNB 20. That is, the switching controller 175 requests for the handover to the macro eNB 20. If a handover response is received from the macro eNB 20, the switching controller 175 forwards the handover response to the femto eNB 30 in response to the handover request.

Otherwise, if it is determined that the target eNB is another femto eNB at step 613, the switching controller 175 requests the target femto eNB 30 for the handover at step 615. That is, the femto controller 175 checks the target femto eNB based on the identity information received from the current femto eNB 30 and requests the target femto eNB to prepare the handover. If the handover request message is received in the format of FIG. 14, the switching controller 175 can request for the handover from the current femto eNB 30 another femto eNB. The switching controller 175 monitors receipt of the handover response at step 617. If the handover response is received, the switching controller 175 forwards the handover response to the current femto eNB 30 at step 619. That is, the switching controller 175 responds to the handover request sent by the current femto eNB 30 by reflecting whether the target femto eNB has accepted the handover. At this time, the switching controller 175 may generate the handover response message to the current femto eNB 30 in response to the handover request message.

The system and method of the present invention is capable of supporting handover between femto eNBs as well as between macro eNBs, and between macro and femto eNBs, thereby securing reliable connectivity of the UE on the move while receiving the communication service. As a result, the system and method of the present invention is capable of improving communication service quality.

As described above, the communication system, femto eNB thereof, and clustering and handover method of the same according to the present invention are capable of supporting handover between femto eNBs as well as handover between macro eNBs and between macro and femto eNBs. Also, the present invention is capable of securing reliable connectivity of the UE on the move while receiving the communication service provided by the communication system. Furthermore, the present invention is capable of improving the communication service quality.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for a femto base station to support handover in a communication system, the method comprising:
 storing identity information of another femto base station in a same cluster to which the femto base station belongs;
 determining, when a terminal connected to the femto base station requests for handover, whether the handover is directed to the another femto base station in the same cluster based on the stored identity information of the another femto base station; and
 performing, when the handover is directed to the another femto base station in the same cluster, the handover to the another femto base station,
 wherein the storing of the identity information of the another base station comprises:
 transmitting, when the femto base station powers on, location information to a femto manager storing identity information of the femto base station and customer information; and
 storing, at the femto manager when the another femto base station is determined as being in the same cluster based on the customer information and location information, the identity information of the another femto base station.

2. The method of claim 1, wherein the performing of the handover comprises:
 generating a handover request message having cell information structured in a format different from the cell information of a macro base station;
 transmitting the handover request message to a femto switch relaying a femto base station different from the current femto base station;
 commanding, when a handover response message is received from the femto switch in response to the handover request message, the UE to perform the handover.

3. The method of claim 1, wherein the performing of the handover comprises executing, at the femto base station, the handover through an operation frequency area using a pseudo noise code different from the pseudo noise code of the another femto base station.

4. A handover execution apparatus of a femto base station in a communication system, the apparatus comprising:
 a memory configured to store identity information of another femto base station in a cluster to which the current femto base station belongs; and
 a controller configured to determine, when a handover request is received from a terminal connected to the femto base station, whether the handover is directed to the another femto base station based on the stored identity information of the another femto base stations, to control, when the handover is directed to the another femto base station, the handover to the another femto base station, to transmit, when the femto base station powers on, location information to a femto manager storing identity information of the femto base station and customer information, and to store, at the femto manager when the another femto base station is determined as being in the same cluster based on the customer information and location information, the identity information of the another femto base station.

5. The apparatus of claim 4, wherein the controller generates a handover request message having cell information structured in a format different from the cell information of a macro base station, transmits the handover request message to a femto switch relaying a femto base station different from the current femto base station, and commands, when a handover response message is received from the femto switch in response to the handover request message, the UE to perform the handover.

6. The apparatus of claim 4, wherein the controller executes the handover through an operation frequency area using a pseudo noise code different from the pseudo noise code of the another femto base station.

* * * * *